April 6, 1937. C. J. McKINNEY 2,075,820
STRIKER PLATE FOR DOOR LATCH BOLTS
Filed March 23, 1935
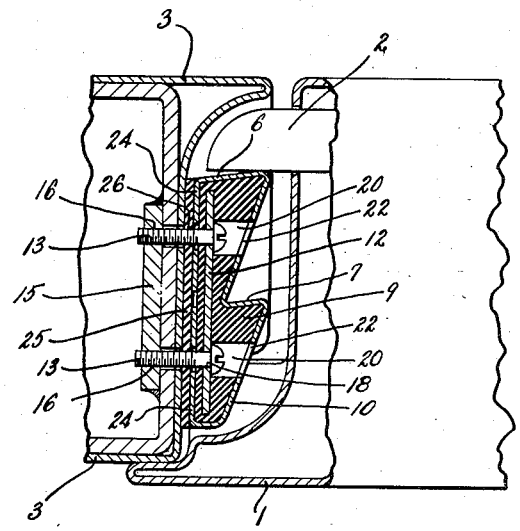
FIG.—1
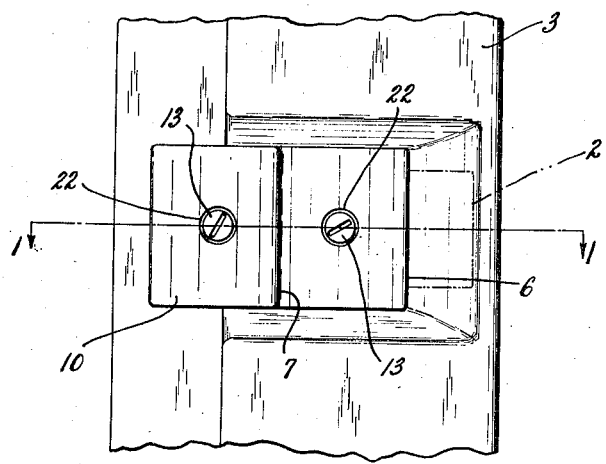
FIG.—2
INVENTOR
CARLOS J. McKINNEY
BY
Birkett, Hyde, Higley + Meyer
ATTORNEYS Patented Apr. 6, 1937

2,075,820

UNITED STATES PATENT OFFICE 2,075,820

STRIKER PLATE FOR DOOR LATCH BOLTS

Carlos J. McKinney, Detroit, Mich., assignor of one-half to James S. Reid, Shaker Heights, Ohio Application March 23, 1935, Serial No. 12,535

2 Claims. (Cl. 292—340)

This invention relates to an improved striker plate which is especially adapted for use with the latch bolts of automobile doors.

It is the present practice to make striker plates for automobile door latch bolts of solid metal, either as forgings or as castings, and to directly connect said plates to the metal door frames of the automobile bodies. As a result of the solid, unyielding character of said striker plates and of their metal to metal connection to the door frames, not only are the automobile door latch bolts and their associated parts subjected to considerable wear but also, objectionable noise is produced in closing such doors.

It is therefore the general object of the present invention to provide for automobile door latch bolts an improved striker plate which effectively minimizes such wear and such noise, said plate being of simple and inexpensive form and capable of being readily and conveniently connected to an automobile door frame.

Further objects of the present invention, and further features thereof, will be apparent from the following description of one embodiment thereof, reference being had to the accompanying drawing in which Fig. 1 is a detail cross-sectional view of portions of an automobile door and an automobile door frame, said frame having connected thereto, for cooperation with the latch bolt of the door, a striker plate embodying the present invention; and Fig. 2 is a plan view of the face of said striker plate and a portion of the door frame to which it is connected.

In said drawing, 1 designates a portion of a sheet metal automobile door having a suitable latch bolt 2 and 3 designates an adjacent sheet metal portion of an automobile body door frame to which is suitably connected, for cooperation with said latch bolt, the present improved striker plate.

The striker plate here illustrated is of the double latch type, having a main shoulder 6 at its rear end for cooperation with said latch bolt in maintaining the door fully closed and having a safety shoulder 7 intermediate its ends for cooperation with said latch bolt in preventing accidental opening of said door in the event that it is not fully closed.

Instead of making said striker plate of solid metal throughout, either as a casting or as a forging, as is now the practice, said plate has a body portion 9 of yieldable material, such as rubber, and a relatively thin face plate 10, of metal or other suitable wear-resisting material.

As shown in Fig. 1, said yieldable body portion has a configuration corresponding to that of the finished striker plate and has suitably embedded therein a longitudinally disposed metal strip 12 which serves as an abutment for the heads of a pair of machine screws 13 which are employed to connect the present striker plate to the door frame 3, a backing plate 15 being arranged within and being welded or otherwise suitably connected to said door frame to receive, in the threaded openings 16 thereof, the inner ends of said screws.

Said abutment strip and the inner part of said body portion are provided with suitable openings 18 to receive the shanks of said screws and the outer part of said body portion is provided with suitable openings 20, of enlarged size, to receive the heads of said screws, said screw heads being confined within such enlarged openings 20 when the striker plate is connected to the door frame 3.

The face plate 10 for said body portion is contoured to correspond to the surface configuration of the face and ends of said body portion, and is provided with suitable openings 22 to permit the heads of the machine screws 13 to be passed therethrough into the enlarged openings 20 of the body portion 9 in connecting the present striker plate to the door frame 3. As shown in Fig. 1, the end portions 24 of said cover member are bent inwardly beneath said body portion so that the connection of said body portion to the automobile door frame 3 securely maintains said face plate in proper assembly with said body portion.

Interposed between the inwardly bent end portions 24 of said face plate and the automobile door frame 3 is a yieldable member 25, of rubber or the like, provided with suitable openings 26 through which extend the shanks of the machine screws 13, thereby insuring that such member will be maintained in proper position.

Because of the yieldable character of the body portion 9 of the present striker plate and its yieldable connection, through the interposed member 25, to the automobile door frame 3, wear of the door latch bolt 2 and its associated parts and noise in closing said door are effectively minimized, as will be readily understood.

While it is believed that the value and advantages of the present invention will be readily apparent from the foregoing description of one embodiment thereof, it is to be understood that said invention is not limited to what is herein described and illustrated but includes all such changes that fall within the scope of what is claimed.

What I claim is:

1. A striker plate for door latch bolts, comprising a yieldable body member, a metallic face plate therefor having its end portions bent inwardly beneath said member, means for connecting said member and hence said face plate to a door frame, an abutment member for said connecting means embedded in said yieldable member, and yieldable means interposed between said door frame and the inwardly bent end portions of said face plate.

2. A striker plate for door latch bolts, comprising a yieldable body portion having a configuration corresponding to that of the finished striker plate, a wear-resisting face plate therefor contoured to conform to the surface configuration of the front face of said body portion and having tongues extending along the rear face thereof, a metallic abutment member embedded in said yieldable body portion, and screw means extending through aligned openings in said body portion, abutment member and tongues for securing said body portion and its face plate to a door frame, said body portion having recesses beneath the face plate to receive the screw heads, and said face plate having openings opposite the screw heads through which they may be manipulated.

CARLOS J. McKINNEY.